United States Patent [19]
Redding

[11] 3,709,530
[45] Jan. 9, 1973

[54] AUXILIARY RETENTION FOR A C-WASHER

[75] Inventor: Wilford A. Redding, Bailey, Mich.

[22] Filed: June 25, 1971

[21] Appl. No.: 156,675

[52] U.S. Cl.............................287/52.07, 287/52.08
[51] Int. Cl................................................F16d 1/08
[58] Field of Search....85/51, 8.6; 287/DIG. 7, 52.08, 287/52.07, 53

[56] References Cited

UNITED STATES PATENTS

| 1,747,741 | 2/1930 | Sprung | 85/8.6 |
| 2,261,415 | 11/1941 | Schnell | 85/51 |
| 2,341,191 | 2/1944 | Orendorff | 287/52.08 X |
| 2,210,811 | 8/1940 | Kelpsch | 287/53 |
| 2,658,699 | 11/1953 | Rovas | 85/51 |
| 2,554,957 | 5/1951 | Riblet | 85/51 |

FOREIGN PATENTS OR APPLICATIONS

| 1,247,760 | 8/1967 | Germany | 85/8.6 |

Primary Examiner—Andrew V. Kundrat
Attorney—Glenn B. Morse

[57] ABSTRACT

A C-washer normally retained behind a shoulder on a shaft by an end recess on a member carried by the shaft, the C-washer having means adapted to narrow the gap adjacent the opening of the C-washer after assembly to the shaft, in order to close the gap of the washer to a distance less than the shaft diameter and prevent disengagement of the washer on axial displacement on the member carried by the shaft.

1 Claim, 6 Drawing Figures

PATENTED JAN 9 1973 3,709,530

INVENTOR
Wilford A. Redding

BY
ATTORNEY 3,709,530

AUXILIARY RETENTION FOR A C-WASHER

BACKGROUND OF THE INVENTION

It is common practice to prevent a member carried by a shaft from slipping out of engagement with the shaft through the use of a C-washer engaging a groove in the shaft, and projecting radially beyond the shaft periphery to function as an abutment. The C-washer is conventionally retained in place in a variety of ways. One of these is to grip the ends of the washer with sufficient force to wrap it around the shaft to a point that the gap is closed to a dimension less than the shaft diameter. This version of the C-washer is occasionally referred to as a "clinch ring". In the larger sizes of these devices, this type of closure becomes extremely difficult, particularly in applications where access is limited. Other systems for maintaining the engagement of the C-washer with the shaft include a lateral press fit, and a related arrangement involving a sufficient resilience of the C-washer to permit it to be forced open to a slight degree in the process of engagement with the shaft, with an internal configuration permitting the resilience to close the device slightly around the shaft after arriving at fully assembled position. One very frequently used retention arrangement involves the formation of a recess on an axial end of a member carried by the shaft, with the recess being of a diameter sufficient to receive the exterior of a C-washer loosely slipped into a groove on the shaft. As long as the C-washer is retained within the recess, sufficient lateral movement to disengage it from the shaft is impossible. A problem arises, however, if accumulations of tolerance or wear permit sufficient axial displacement of the member with respect to the shaft to permit the C-washer to move out of the confinement of the recess. It is this type of situation that was primarily responsible for the development of the present invention. This form of assembly is commonly used in connection with axle shafts on automobiles and trucks. The rear axle of these vehicles is rotatably supported in the axle housing, and extends inward to a point where it supports a bevel gear associated with the differential assembly. This bevel gear becomes the member provided with a recess on its inner face, and a heavy C-washer engages a groove in the shaft at a point where the washer will normally be retained against lateral displacement by being received within this recess. The gear is rotatably restrained against rotation with respect to the shaft by a standard spline interengagement. In the event of unusual accumulations of tolerance, or of sufficient wear against the thrust bearing surfaces of the axle housing, cases have been encountered quite frequently in which the gear will move with respect to the shaft to a position in which the C-washer is no longer confined against slipping off the shaft. This is an extremely dangerous situation, as this condition will permit the entire wheel assembly, including much of the brake system to move freely out of the car. This usually happens with no warning at all, and can take place at sufficient speeds to produce extreme danger to the occupants of the vehicle, and to other vehicles proceeding in that neighborhood. The objective of the present invention is to provide an auxiliary retention means that will make this sort of occurrence impossible, and without requiring additional installation access or costly modification of conventional differential assembly structure.

SUMMARY OF THE INVENTION

A C-washer is provided with means adjacent one of its ends which may be used to narrow the gap after assembly to the shaft to a point where the distance across the gap is less than the diameter of the portion of the shaft engaged by the gap. The preferred form of the invention utilizes a set screw traversing the material of the C-washer at a point adjacent the end, and in a position where it can be rotated by application of a tool from the side (with respect to the shaft) to a point where it can move inward so that its inner end is disposed at a distance from the opposite side of the washer less than the shaft diameter at the base of the groove which receives the washer. This arrangement is preferable primarily because of its small requirement of access, as the set screw can be of the type manipulated by either a small screw driver or a so-called Allen wrench, which is nothing but a small piece of steel of hexagonal cross-section. A modified form of the invention, which can be used in applications where it is possible to apply a punch or hammer to the end of the C-washer involves the use of a notch which produces a point of localized bending under relatively small forces, with the result that a relatively light tap applied through a tool to the extreme end of the C-washer will result in bending the projecting portion down into a position where the gap is sufficiently closed to retain the washer in position. In contrast to the "clinch ring" arrangement mentioned in the discussion of the background of the invention, this system does not require the mechanic to apply forces across the gap in order to close it, or to bend the entire ring sufficiently to wrap it around the shaft.

DESCRIPTION OF THE PREFERRED EMBODIMENTS

Figure 1:
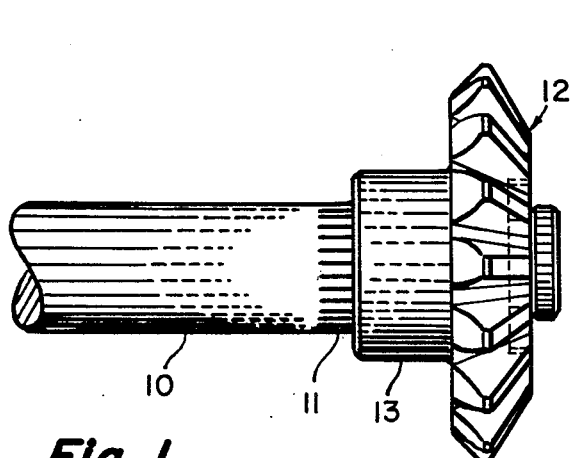
FIG. 1 is a side elevation of a conventional vehicle rear axle, engaged by the bevel gear, with the assembled relationship being maintained by a C-washer received in a recess in the end of the gear.
Figure 2:
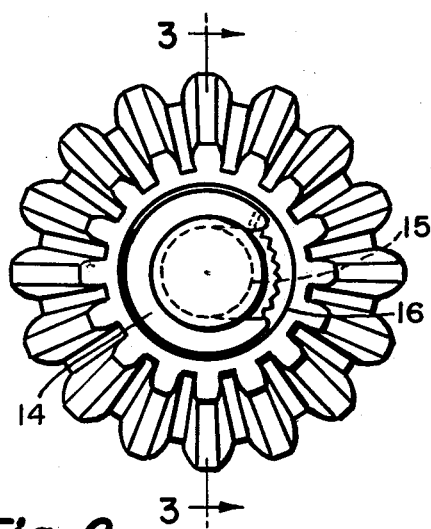
FIG. 2 is a side elevation of the assembly shown in FIG. 1, showing the use of a C-washer embodying the present invention.
Figure 3:
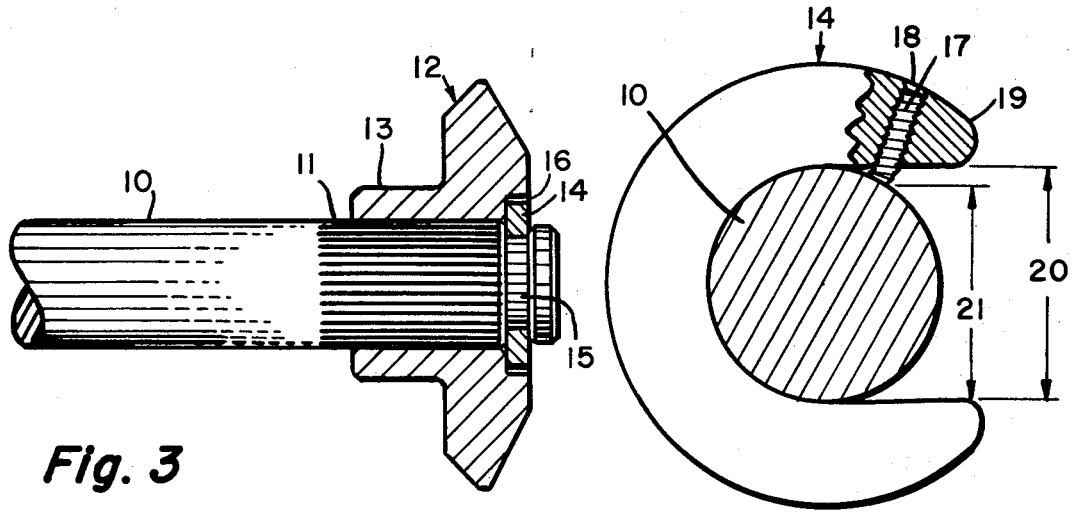
FIG. 3 is a section on the plane 3—3 of FIG. 2.

Referring to FIGS. 1, 2, and 3, the shaft 10 has a splined end 11 receiving a gear generally indicated at 12, and having a hub 13 provided with an internal spline interengaged with the shaft spline 11. The gear 12 is retained in assembled relationship with the shaft by the presence of the C-washer 14 received in the annular groove 15 in the end of the shaft 10. The gear 12 has a recess 16 in the end adjacent the washer 14, with the diameter of the recess being slightly in excess of the exterior diameter of the washer. The axial depth of the recess 16 is preferably at least equal to the thickness of the Cewasher 14.

Figure 4:
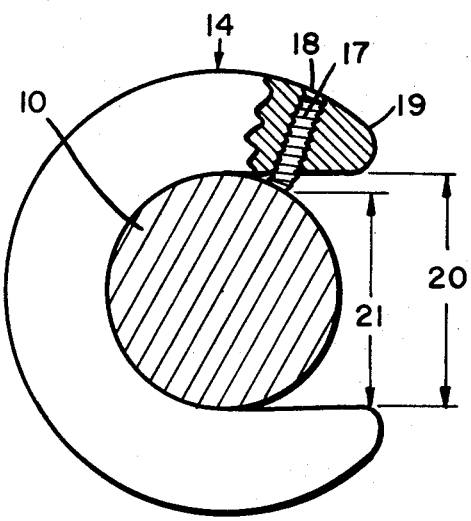
FIG. 4 is a section on an enlarged scale on a plane perpendicular to the axis of the shaft, and illustrating the arrangement for retaining the washer in position.

To prevent the C-washer 14 from slipping laterally out of engagement with the shaft 10 on displacement of the gear 12 to the left, as shown in FIGS. 1 and 3, the set screw 17 is engaged with an appropriately threaded hole 18 adjacent the end 19 of the washer 14, and this set screw can be rotated into the position shown in FIG. 4 to retain the washer against displacement to the left. The original gap 20 of the C-washer is thus reduced to the smaller gap 21, which is less than the diameter of the shaft at the base of the groove 15. The axis of the set screw 17 will normally be disposed in a plane perpendicular to the axis of the shaft 10, and it is preferrable that the axis of the set screw 17 be slightly askew to a radius of the shaft axis. This arrangement generates a small degree of binding action as the end of the set screw engages the surface of the shaft and in forced sideways, tending to inhibit a loosening of the set screw.

Figure 5:
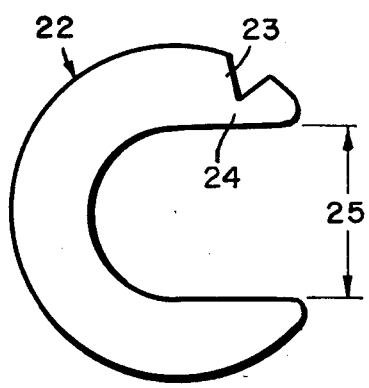
FIG. 5 is a plan view of a modified form of the invention, in the initial condition prior to assembly with a shaft.
Figure 6:
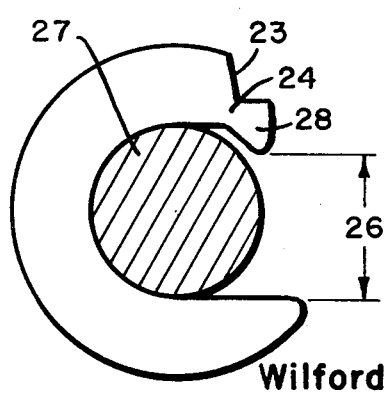
FIG. 6 is a view similar to FIG. 5, but showing the washer deformed into retaining position after assembly with the shaft.

In the modification shown in FIGS. 5 and 6, the C-washer 22 is provided with a notch 23 providing an area 24 of locally reduced resistance to bending. The initial gap 25 of this C-washer is thus closeable to the gap shown at 26 in FIG. 6, which is less than the diameter of the embraced shaft 27 at the base of the groove.

Both of these modifications of the invention are easily reset to permit dis-assembly of the shaft and gear, the FIG. 4 arrangement by backing off the set screw 17, and the FIG. 6 arrangement by the insertion of a screw driver or punch under the deformed end 28 to pry it back to the FIG. 5 position. Neither of these modifications of the invention require the application of forces to more than one end of the C-washer.

I claim:

1. In combination with a shaft having means forming a shoulder transverse to the axis of said shaft, and a member carried by said shaft, said member having a recess in an axial end thereof, a C-washer having a gap adapted to slip over said shaft laterally and engage said shoulder axially, the exterior of said washer being receivable in said recess to maintain the lateral engagement of said washer with said shaft, wherein the improvement comprises: adjustable means on said C-washer adjacent an end of said washer defining the opening of said gap, and adapted to narrow said gap exclusively at said means to a distance less than the diameter of said shaft received in said gap, said adjustable means including a set screw traversing said washer on an axis disposed in a plane transverse to the axis of said shaft.

* * * * *